(12) United States Patent
Yamada

(10) Patent No.: US 8,289,544 B2
(45) Date of Patent: Oct. 16, 2012

(54) PRINTING SYSTEM AND PRINTING DEVICE FOR PROVIDING TIME DESIGNATING FUNCTION FOR EXECUTING PRINTING OPERATION

(75) Inventor: Akihiro Yamada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1248 days.

(21) Appl. No.: 12/043,516

(22) Filed: Mar. 6, 2008

(65) Prior Publication Data

US 2008/0304099 A1  Dec. 11, 2008

(30) Foreign Application Priority Data

Apr. 19, 2007  (JP) .................. 2007-110621

(51) Int. Cl.
*G06F 3/12*  (2006.01)
(52) U.S. Cl. ..................................... 358/1.15
(58) Field of Classification Search ............ 358/1.1, 358/1.12, 1.15
See application file for complete search history.

(56) References Cited

FOREIGN PATENT DOCUMENTS

| JP | 2003-280843 | * | 2/2003 |
|---|---|---|---|
| JP | 2003-220742 | * | 5/2003 |
| JP | 2003-220742 | | 8/2003 |
| JP | 2003-280843 A | | 10/2003 |

OTHER PUBLICATIONS

JP Office Action dtd Apr. 16, 2009, JP Appln. 2007-110621.

* cited by examiner

*Primary Examiner* — Benny Q Tieu
*Assistant Examiner* — Jeremiah Bryar
(74) *Attorney, Agent, or Firm* — Banner & Witcoff, Ltd.

(57) ABSTRACT

A printing device is configured to execute a plurality of time-designated print jobs. A request source of each of the plurality of time-designated print jobs is identified. If there exists at least one close job for which a designated execution time is within a predetermined period with respect to a designated execution time of a first reference job and for which the print request source is the same as that of the first reference job, the designated execution times of the first reference job and each of the at least one close job are changed to be close to a designated execution time of a second reference job. Then, a print process regarding the plurality of print jobs is executed when the current time coincides with each of the changed execution times of the plurality of time-designated print jobs.

20 Claims, 6 Drawing Sheets

PRINT DATA

100
- 100H HEADER PART
- 100D DATA PART

FIG. 2

PRINTING SYSTEM AND PRINTING DEVICE FOR PROVIDING TIME DESIGNATING FUNCTION FOR EXECUTING PRINTING OPERATION

CROSS-REFERENCE TO RELATED APPLICATION

This application claims priority under 35 U.S.C. §119 from Japanese Patent Application No. 2007-110621 filed on Apr. 19, 2007. The entire subject matter of the application is incorporated herein by reference.

BACKGROUND

1. Technical Field

The following description relates to a printing device having a time-designating function to execute a printing operation at a designated (programmed) time, and a printing system employing such a printing device.

2. Related Art

Conventionally, a printing device having a time-designating function has been known. An example of such a printing device is disclosed in Japanese Patent Provisional Publication No. 2003-220742 (hereinafter, referred to as '742 publication). The printing device disclosed in '742 publication is also provided with a power saving function (e.g., a so-called sleeping function). That is, if a print request has not been received for a predetermined period of time, an operation mode of the printing device is switched from a normal mode, in which the printing can be executed immediately upon receipt of the print request), to the power saving mode. When the operation mode is switched between the power saving mode and the normal mode, an ON/OFF state of some components of the printing device (e.g., a fixing unit of a laser beam printer) is changed. In particular, when the operation state is changed from the power saving mode to the normal mode, a power consumption of some components may be temporarily larger than the power consumption in the normal mode since, for example, the operating status of the fixing unit should be changed to the normal mode within a relatively short period of time. Therefore, it is not preferable that the switching between the normal mode and the power saving mode occurs frequently in view of the power consumption.

According to the '742 publication, when a print job corresponding to a certain printing request is to be executed, it is checked whether a time-designated print job is in a printing queue. If the time-designated print job to be executed at a designated time is in the print queue, and the designated time is relatively close to the current time, at which the current print job is to be executed, the designated time of the time-designated print job is changed so that the time-designated print job is executed immediately after the current print job. With such a conventional configuration, the frequency of the mode change can be reduced, thereby the power consumption being reduced.

SUMMARY OF THE INVENTION

According to '742 publication, whether requesting sources (e.g., users) of the current print job and the time-designated print jobs are the same or not is examined. Therefore, even if the two print jobs are requested by different users, the designated time of the time-designated print job is automatically changed, and the two print jobs are executed subsequently. In such a case, the user of the first print job (i.e., the current print job) may mistakenly take all the printed documents.

In consideration of the above problem, the present invention is advantageous in that the above problem can be avoided.

According to aspects of the invention, there is provided a printing system including a printing device and an information processing device which is communicatable with the printing device. The printing system is provided with a first storage configured to store a plurality of print jobs corresponding to a plurality of print requests issued by the information processing device, the plurality of print jobs including a first reference job and a second reference job, an identifying unit capable of identifying a request source of each of the plurality of print jobs stored in the first storage, a first judging unit configured to judge whether there exist at least one close job which is defined such that a difference between a print start time of the first reference job and a print start time of each of the at least one close job is within a reference period and a request source of the close job has a predetermined relationship with a request source of the first reference job, a time changing unit configure to change the print start time of the first reference job and the print start time of each of the at least one close job to a time close to a print start time of the second reference job if the first judging unit judges that there exist the at least one close job, the time changing unit remaining the print start time of the first reference job and the print start time of each of the at least one close job as they are if the first judging unit judges that the there is no close job, and a printing unit configured to execute a print process regarding the plurality of print jobs when the current time coincides with each of the print start times of the plurality of print jobs.

According to other aspects of the invention, there is provided with a printing device configured to receive print requests from an information processing device which is communicatable with the printing device, which is provided with a first storage configured to store a plurality of print jobs corresponding to a plurality of print requests issued by the information processing device, the plurality of print jobs including a first reference job and a second reference job, an identifying unit capable of identifying a request source of each of the plurality of print jobs stored in the first storage, a first judging unit configured to judge whether there exist at least one close job which is defined such that a difference between a print start time of the first reference job and a print start time of each of the at least one close job is within a reference period and a request source of the close job has a predetermined relationship with a request source of the first reference job, a time changing unit configure to change the print start time of the first reference job and the print start time of each of the at least one close job to a time close to a print start time of the second reference job if the first judging unit judges that there exist the at least one close job, the time changing unit remaining the print start time of the first reference job and the print start time of each of the at least one close job as they are if the first judging unit judges that the there is no close job, and a printing unit configured to execute a print process regarding the plurality of print jobs when the current time coincides with each of the print start times of the plurality of print jobs.

According to further aspects of the invention, there is provided a computer-accessible recording medium containing a program to be executed by a controller of a printing device, the program, when executed, controlling the printing device to execute time-designated print jobs. The program controlling the printing device to execute the steps of storing a plurality of time-designated print jobs, the plurality of time-designated print jobs including a first reference job and a second reference job, identifying a request source of each of the plurality of time-designated print jobs stored in the first storage, first judging whether there exist at least one close job which is defined such that a difference between a designated execution time of the first reference job and a designated execution time of each of the at least one close job is within a reference period and a request source of the close job has a predetermined relationship with a request source of the first reference job, changing the designated execution time of the first reference job and the designated execution time of each of the at least one close job to a changed execution time close to a designated execution time of the second reference job if the first judging step judges that there exist the at least one close job, the changing step remaining the designated execution time of the first reference job and the print start time of each of the at least one close job as they are if the first judging step judges that the there is no close job, and executing a print process regarding the plurality of time-designated print jobs when the current time coincides with each of the changed designated execution times of the plurality of time-designated print jobs.

BRIEF DESCRIPTION OF THE ACCOMPANYING DRAWINGS

FIG. 1 is a block diagram showing an electrical configuration of a printing system including a PC (personal computer) and a printer.

FIG. 2 schematically shows a structure of print data.

DETAILED DESCRIPTION

Hereinafter, an embodiment of the present invention will be described with reference to the accompanying drawings.

Figure 1:
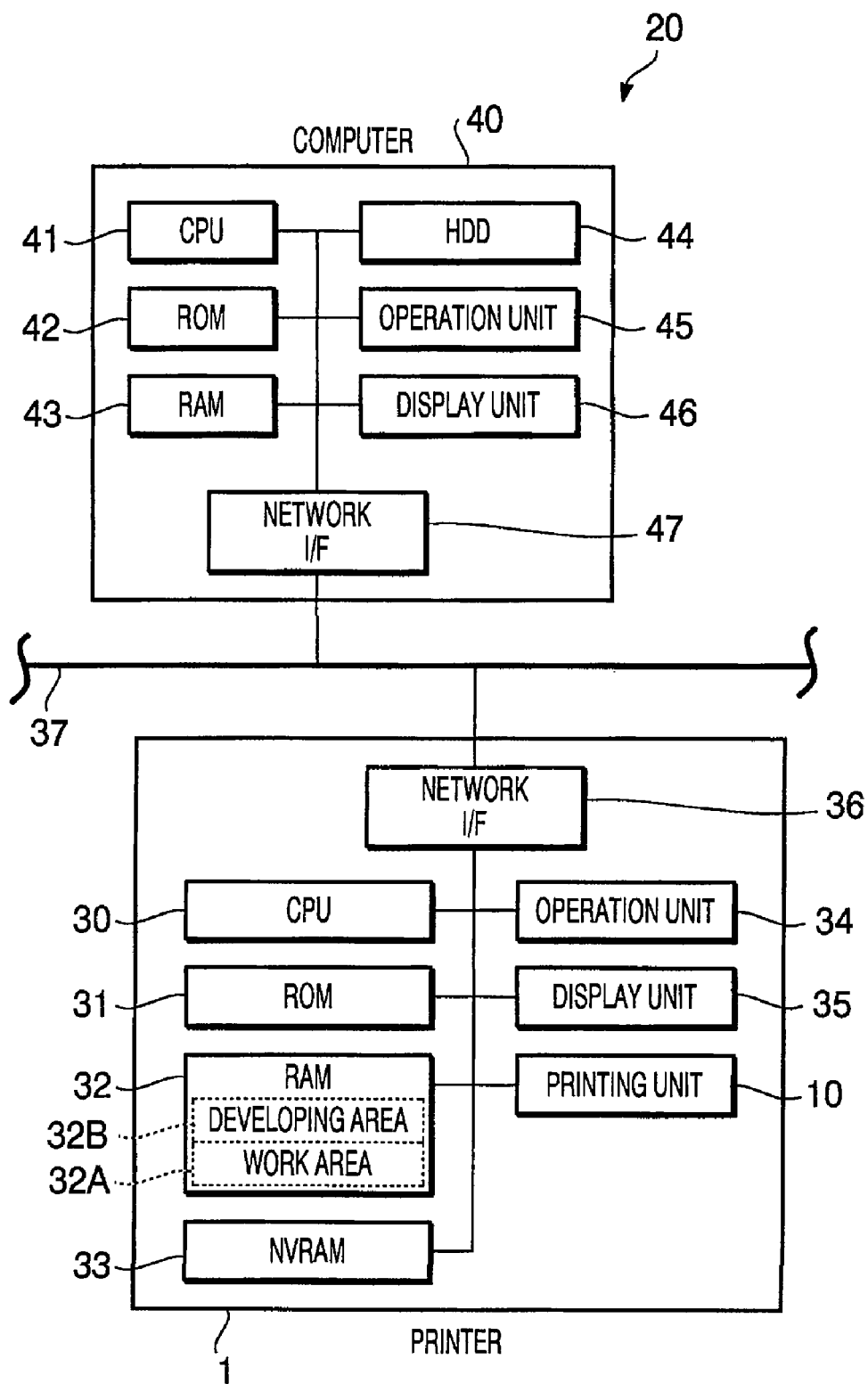

FIG. 1 is a block diagram showing electric configurations of a printing system 20 which includes a printer 1 and a plurality of PCs (Personal Computers) 40 connected to the printer 1 via a communication line 37 (only one of the PCs 40 is shown in FIG. 1 for brevity).

The printer 1 has, as shown in FIG. 1, a CPU (Central Processing Unit) 30, a ROM (Read Only Memory) 31, a RAM (Random Access Memory) 32, an NVRAM (Non-Volatile RAM) 33, an operation unit 34, a display unit 35, a printing unit 10 and a network I/F (interface) 36.

The ROM 31 stores a plurality of programs for controlling the operation of the printer 1 (e.g., a program causing the CPU 30 to execute a printing process described later). The CPU 30 executes each program read out of the ROM 31 and controls the operation of the printer 31 with storing processing results in the RAM 32 and NVRAM 33.

The operation unit 34 is provided with a plurality of buttons, and allows a user to input various commands such as a print request command. The display unit 35 is provided with an LCD (Liquid Crystal Display) and indication lamps, and is capable of displaying various setting windows and the operation statuses of the printer 1. The network I/F 36 is connected to an external computer 40 or the like through the communication line 37 so that data communication can be done between the printer 1 and the external computer 40 or the like.

The computer 40 is provided with a CPU 41, a ROM 42, a RAM 43, an HDD (Hard Disk Drive) 44, an operation unit 45, an display unit 46 and a network I/F 47. The HDD 44 stores various programs including application software and printer driver for generating data for printing. The operation unit 45 is provided with a keyboard and a pointing device such as a mouse to designate a desired position on the display unit 46. The display unit 46 is provided with an LCD. The network I/F 47 is connected to the communication line 37.

FIG. 2 schematically shows a data structure of the print data 100 which is transmitted from the PC 40 to the printer 1. Specifically, when the user of the PC 40 operates the operation unit 45 to input (to issue) a print request command, the printer driver is executed so that the CPU 41 converts data generated by application software for printing to generate PDL (Page Descriptive Language) data or a GDI (Generic Data Interface) data, which is kind of compressed raster data, to generate the print data as shown in FIG. 2.

The print data includes, as shown in FIG. 2, a header part 100H and a data part 100D that is an image data part. In the header part 100H, header information is recorded. The header information includes an IP address of the PC 40 from which the print data 100 is output, and an IP address of a destination printer 1, to which the print data 100 is transmitted. Further, the header information includes user information, a print request time (i.e., a time when the print request was issued), a document name, an application name, a data type, the number of pages and the like.

Further, the header information includes designated time information which is referred to when the programmed print function is used. The designated time information is for designating a start time when the printer 1 is controlled to print this print data 100, which will be described in detail later, referring to S42 of FIG. 5. It should be noted that the designated time information may represent a completion time at which the printing operation of this print data 100 is completed instead of the start time. The completion time represents a time at which the printer 1 completes the printing operation (e.g., the printer 1 outputs all the recording sheets on which images represented by the print data). When the print data 100 in which the print completion time is designated, the CPU 30 of the printer 1 obtains a time period necessary for completing the print process of the print data 100 based on the data type and the number of pages included in the header information, and determines the print start time, calculates the start time by shifting the print completion time by the time period necessary for executing this printing operation. As above, the print completion time indirectly designates the print start time, and can be considered to be included in the time designating information.

The user of the PC 40 is capable of inputting a desired time as the time designating information described above through the operation unit 45 when the print request regarding the data for printing is made. At this stage, the user can also input, through the operation unit 45, whether change of the print start time designated by the time designating information is inhibited. The CPU 41 records an inhibition flag in the header information when the change of the designated time is inhibited. It should be noted that, for designating the time, the PC 41 may allow the user to input directly designate the time by inputting hours and minutes, or to designate the time by relative hours/minutes with respect to the current time.

Then, the CPU 41 transmits the print data generated as above to the printer 1 through the network I/F 47.

Figure 3:
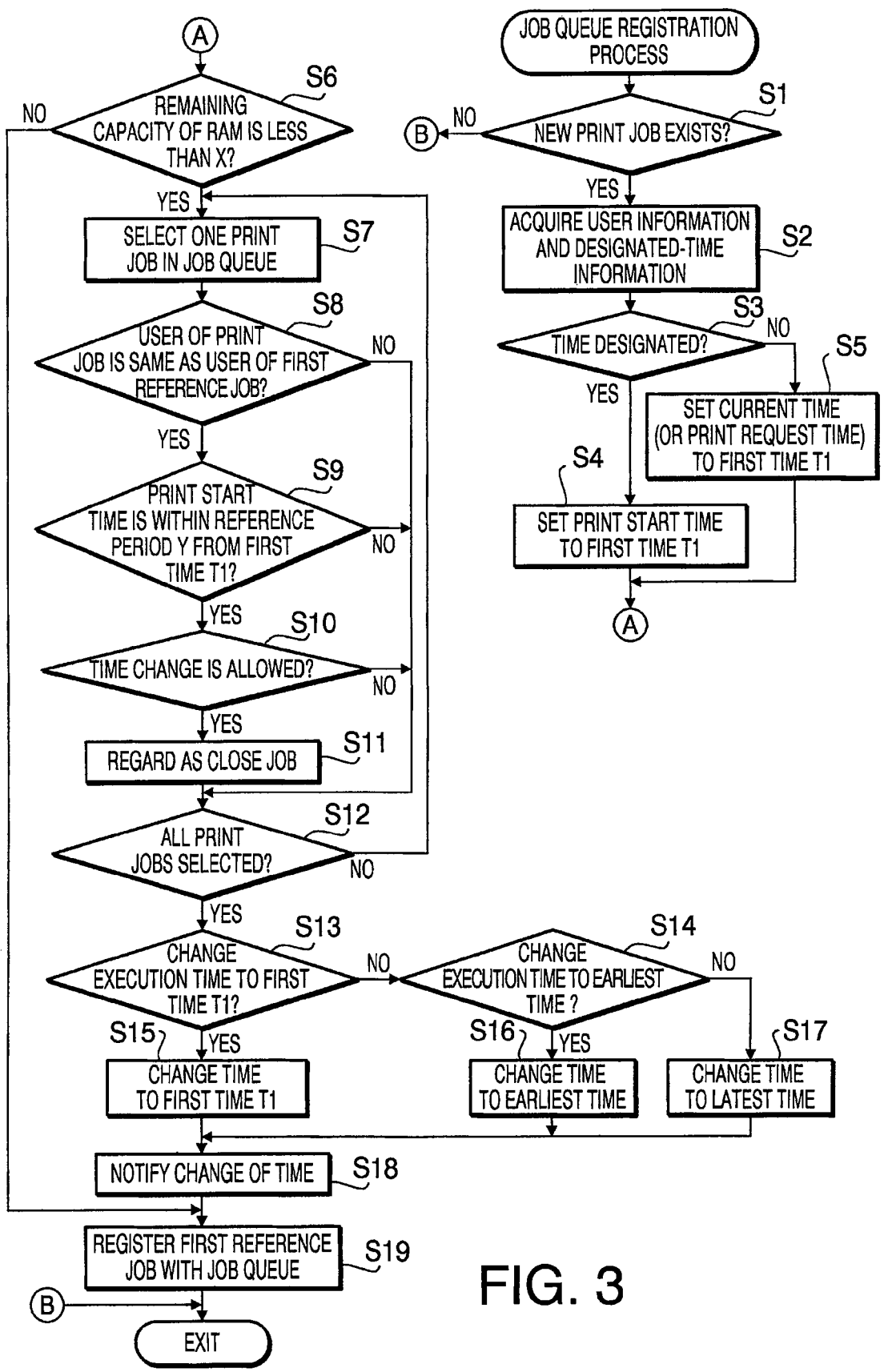
FIG. 3 is a flowchart illustrating a job queue registration process.

FIG. 3 is a flowchart illustrating a job queue registration process executed by the CPU 30 of the printer 1. The job queue registration process is started when the printer 1 is powered on and ready to start the printing operation.

When the print data is received from the computer 40, the CPU 30 executes a developing process. The developing process is for developing the image data of the main part of the print data into bit map data on a developing area 32B defined on the RAM 32 based on the header information of the header part 100H of the print data 100 (see FIG. 2). When the developing process is executed, the CPU 30 generates a new print job having job information based on the header information of the print data on a working area 32A of the RAM 32.

In the job queue registration process, in S1, the process periodically checks whether the new print job exists on the working area 32A. If the new print job exists (S1: YES), the process acquires the "user information" and the "time designating information" from the job information, and judges whether the print start time is designated by the time designating information (S3). If the time is designated (S3: YES), the process sets the print start time designated by the time designating information to a first time T1 (S4). If the time is not designated (S3: NO), the process sets the current time measured by a built-in clock of the printer 1 to the first time T1, or sets the print request time (i.e., a time when the printing is requested on the PC 40) to the first time T1 (S5).

The process judges whether a remaining capacity of the developing area 32B of the RAM 32 is less than a predetermined amount X (e.g., 30% of the total capacity of the developing area 32B). If the remaining capacity of the developing area 32B is less than the predetermined amount X (S6: YES), the process executes a process extracting a "close job" from among print jobs having already been registered with the job queue of the working area 32A.

The close job is defined as a print job of which the user is the same as the user of the new print job, and a difference between the print start time of the close job and the print start time T1 of the new print job is equal to or less than a reference time period Y (e.g., 15 minutes). Incidentally, the new print job will occasionally be referred to as a first reference job hereinafter.

The extraction of the close job may be executed according to one of the following three patterns.
(1) First pattern: print jobs of which the print start times are equal to or later than the first time T1 are subject to extraction.
(2) Second pattern: print jobs of which the print start times are equal to or before the first time T1 are subject to extraction.
(3) Third pattern: print jobs of which the print start times are before or after the first time T1 are subject to extraction.

According to the embodiment, the print jobs whose print start times are equal to or after the first time T1 are subject to the extraction. It should be noted that the user may be allowed to select one of the above three patterns through the operation unit 45 of the PC 40 of the operation unit 34 of the printer 1.

Specifically, the process selects one of the print jobs in the job queue in S7. It should be noted that, although not shown in FIG. 3, if there are no print jobs in the job queue when S7 is executed, the process proceeds to S19 instead of S8. In S8, the process judges whether the user of the selected print job is equal to the user of the first reference job. The judgment can be done based on the user information acquired in S2 and the user information included in the job information of the print job subject to the selection.

If the users of the print jobs are different (S8: NO), the process proceeds to S12. If the users are the same (S8: YES), the process judges whether a difference between the print start time of the print job subject to selection and the first time T1 is within the reference period Y (S9). If the time difference is not within the reference period Y (S9: NO), the process proceeds to S12. If the time difference is within the reference period Y (S9: YES), the process judges whether the print start time of the print job subject to selection is allowed to change. Whether the print start time is allowed to change or not can be judged based on the absence/presence of the inhibition flag. If the inhibition flag is present (i.e., time change is inhibited) (S10: NO), the process proceeds to S12. If the inhibition flag is absent (i.e., time change is allowed) (S10: YES), the process determines that the print job subject to selection is the close job (S11), and the process proceeds to S12.

After all the close jobs have been selected from the job queue (S12: YES), a time change process (S13-S17) is executed. It should be noted that there are three possible patterns in setting the print start time of the close job as follows:
(1) First pattern: To change the print start time of the close job to the first time T1 of the first reference job. In this case, the first reference job is used as a reference job (which will be referred to as a second reference job) for changing the print start time.
(2) Second pattern: To change the print start times of the first reference job and the close jobs to an earliest print start times thereof. In this case, the second reference job is a job having the earliest print start time (which is the first reference job or a close job).
(3) Third pattern: To change the print start times of the first reference job and the close jobs to a latest print start time thereof. In this case the second reference job is a job having the latest print start time (which is the first reference job or a close job).

The user is allowed to select one of the three patterns by operation the operation unit 45 of the PC 40 or the operation unit 34 of the printer 1.

If the first pattern is selected (S13: YES), the process executes the first pattern time change (S15). If the second pattern is selected (S13: NO; S14: YES), the process executes the second pattern time change (S16). If the third pattern is selected (S13: NO; S14: NO), the process executes the third pattern time change (S17).

If there are print jobs of which the print start times have been changed, notification is output in S18. That is, a message notifying the start times of the close jobs have been changed is displayed on the display unit 35 of the printer 1 or the display unit 46 of the PC 40. Alternatively or optionally, a voice message or indicating lamps provided to the printer 1 may be used for notifying. In S19, the process registers the new print job, which is the first reference job, with the job queue, and then the job queue registration process is finished.

The CPU 30 executes, in parallel, a print queue registration process (shown in FIG. 4), and print queue executing process (FIG. 5) as well as the above-described job queue registration process.

Figure 4:
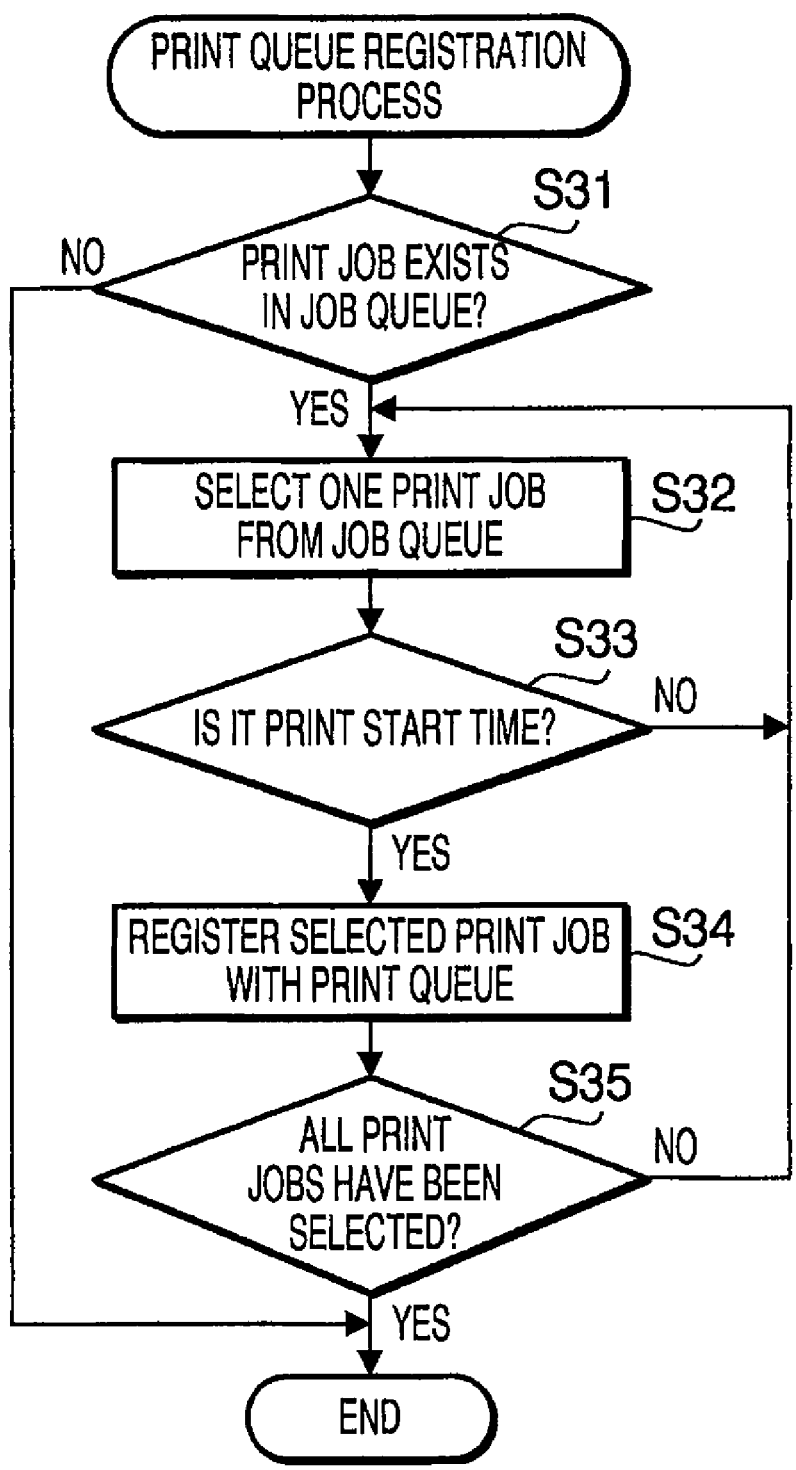
FIG. 4 is a flowchart illustrating a print queue registration process.

FIG. 4 is a flowchart illustrating the print queue registration process. In the print queue registration process, the process judges whether there exists a print job registered in the job queue (S31). If there is a registered print job in the print job queue (S31: YES), the process selects one print job in the job queue (S32), and judges whether the print start time of the thus selected print job coincides with the current time (S33). If the current time has not yet reached the print start time of the selected print job (S33: NO), the process returns to S32. If the current time coincides with the print start time (S33: YES), the process registers the currently selected print job with the print queue. If all the print jobs in the job queue have not yet been selected (S35: NO), the process returns to S32. If all the print jobs in the job queue have been selected (S35: YES), the print queue registration process is completed.

Figure 5:
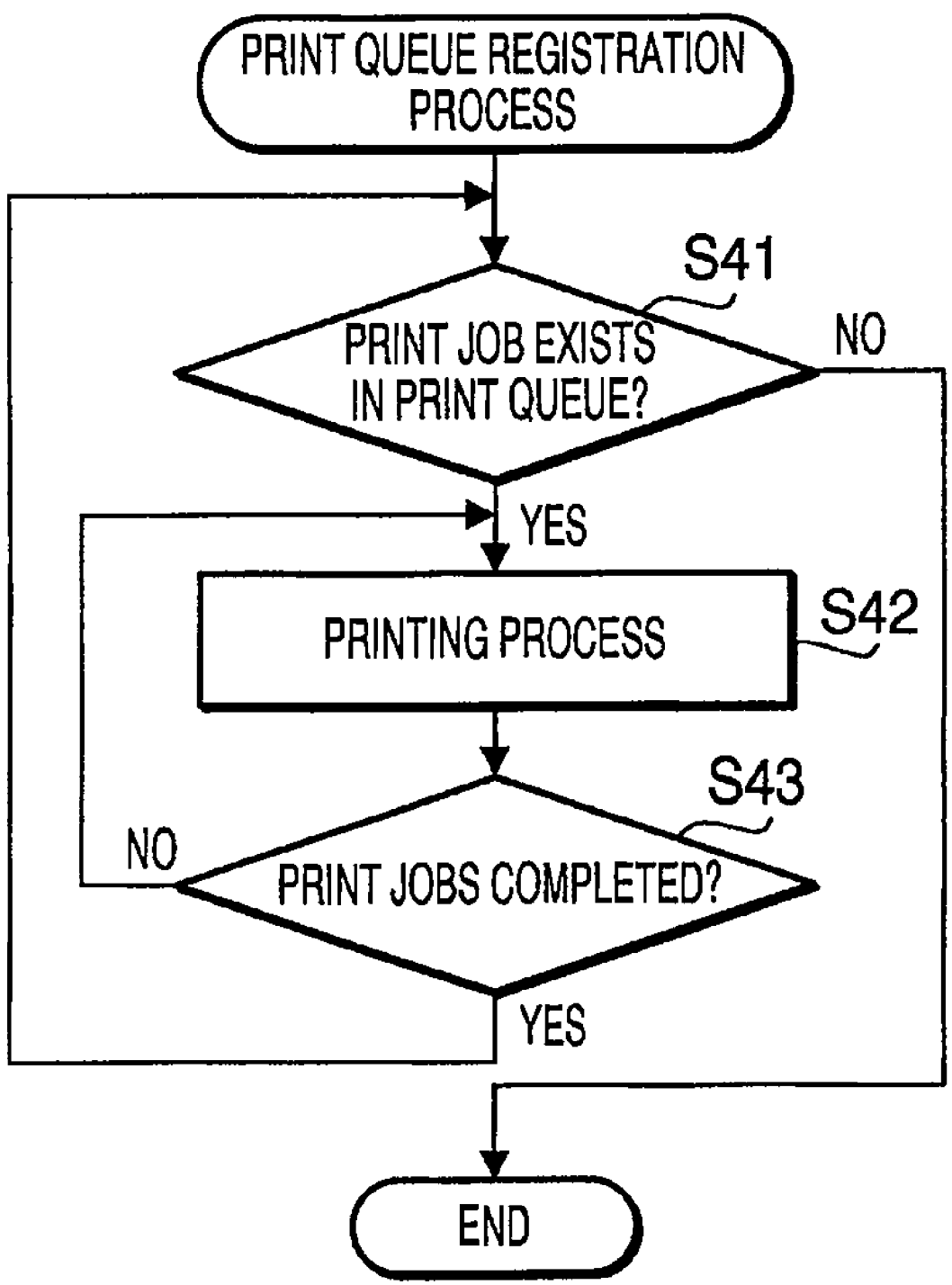
FIG. 5 is a flowchart illustrating a print queue executing process.

FIG. 5 is a flowchart illustrating the print queue printing process. The process judges whether there exist print jobs in the print queue (S41). If there exist print jobs (S41: YES), the process executes the printing process of the print jobs in the order of registration in the print queue (S42, S43). It should be noted that the "printing process" here is a process to transmit an image signal based on bitmap data (which is developed from the print data) related to the print job to the printing unit 10. With this printing process, the printing unit 10 prints an image on a sheet based on the image signal. If the process judges that the printing process regarding the current print job is finished (S43: YES), the process returns to S41. If the process judges that the printing process regarding the current print job is not finished (S43: NO), the process returns to S42. As above, the printing process (S42) is kept executed. If there are no print jobs in the print queue (S41: NO), the print queue printing process is finished.

Figure 6:
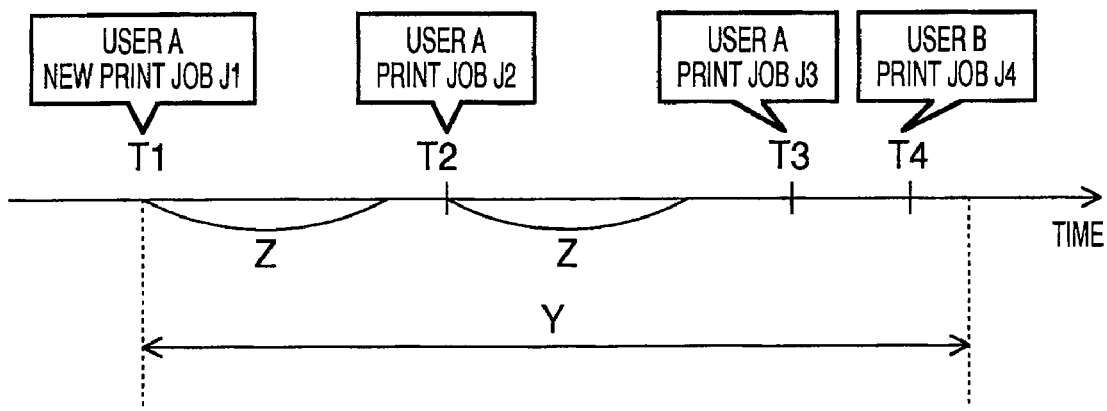
FIG. 6 shows a timing chart illustrating print jobs and times when the print jobs are executed, before the programmed times are changed.
Figure 7:
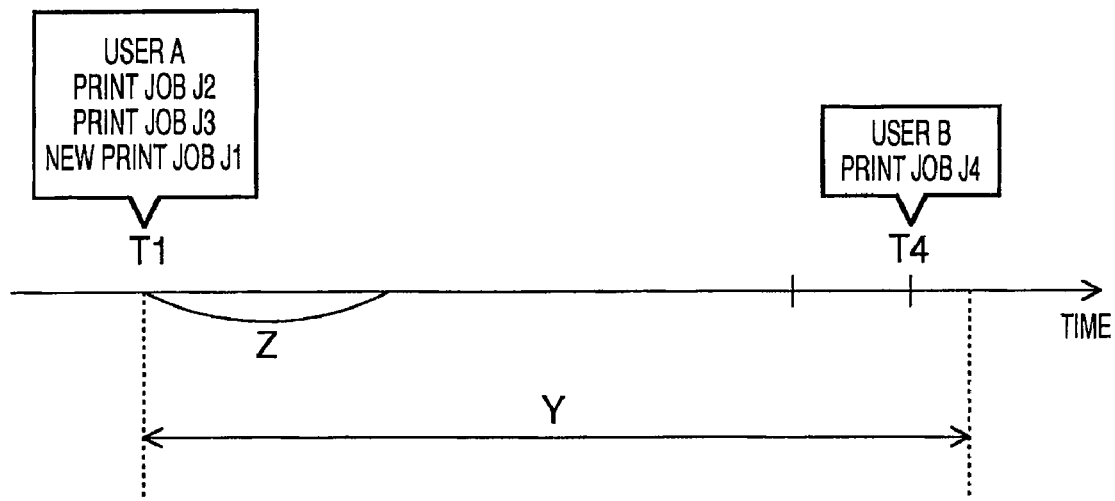
FIG. 7 shows a timing chart illustrating print jobs and times when the print jobs are executed, after the programmed times have been changed.

Incidentally, it is assumed that print jobs J2-J4 have been registered with the job queue as shown in FIG. 6, and a new print job J1 is now being created. It is further assumed that the request source of the print jobs J1-J3 is user A, while the request source of the print job J4 (which is not the first reference job or the close job) is user B. T1-T4 represent print start times of the print jobs J1-J4, respectively.

The printer 1 has the power save function and the operation mode is changed to the power save mode (i.e., low power consumption mode) if the printing operation has not been executed for a predetermined period Z (e.g., for five minutes). In the power consumption mode, for example, motor driving systems (e.g., sheet feed mechanism, polygonal mirror driving mechanism, etc.) are stopped or slowed down, and/or the temperature of the fixing unit is lowered.

In FIG. 6, the difference between the print start times T1 and T2 is greater than the predetermined period Z, and the difference between the print start times T2 and T3 is also greater than the predetermined period Z. Therefore, if the time change process (i.e., S13-S17 of FIG. 3) is not executed, the operation mode of the printer 1 is changed from the normal mode to the power save mode after the new print job J1 is executed and before the print job J2 is executed. Then, when the current time is equal to the print start time of the print job J2, the operation mode of the printer 1 is returned to the normal mode. Similarly, the operation mode is changed to the power save before the print job J3 is executed, and the operation mode is returned to the normal mode when the print job J3 is executed. If the operation mode is changed frequently as above, the power consumption may be increased.

According to the embodiment, however, the time change process is executed to avoid the above problem. That is, as a result of the time change process, the print start times of the print jobs J2 and J3 of which the print request source is user A, are changed to the print start time T1 of the first reference job (i.e., the new print job) J1 when the above-described first pattern is executed. Therefore, when the current time becomes the first time T1, the print jobs J1-J3 are executed. If a new print job is not introduced between the print start times T1 and the T4, the operation mode is changed to the power save mode once, and the power save mode is retained until the next print start time T4. Therefore, in comparison with a situation shown in FIG. 6, the number of times of mode switching can be reduced, thereby suppressing the power consumption.

The print start time of print job J4 is not changed since the user of the print job J4 is different from the print jobs J1-J3. Thus, the print job of user B is not executed simultaneously or continuously with the print jobs of user A.

The bitmap data corresponding to the print jobs of which the print start times are designated is kept stored in the developing area 32B of the RAM 32 until the print start times thereof. Therefore, if the number of the print jobs of which the print start times are designated is greater, the remaining capacity of the developing area 32B is smaller. If the remaining capacity of the storing area 32B is too small, the newly transmitted print data cannot be processed and the printer 1 is in a busy condition where the printer 1 cannot receive the data transmitted from the PC 40.

In order to deal with the above problem, according to the embodiment, if the remaining capacity of the developing area 32B of the RAM 32 is less than the predetermined amount X, the print start time is changed. Accordingly, if there is insufficient remaining amount in the developing area 32B of the RAM 32 at time T1 when the new print job J1 is executed, the print start times of the print jobs J2 and J3 of which the user-designated print start times have not yet come are changed to the first time T1 so that the print jobs J2 and J3 are executed at a time when the print job J1 is executed. With this control, a relatively large area used for developing the bitmap can be obtained in the developing area 32B. Therefore, the print data transmitted from the PC 40 can be processed immediately. If there is a sufficient remaining amount, it may be preferable not to change the print start time of each print job and execute the print jobs at respective print start times as designated by the user. For example, if the printer 1 is located in the office, print requests may be issued frequently and the printer 1 may not operate in the power save mode so frequently in the daytime. In such a case, as far as the remaining capacity of the developing area 32B is sufficient, it is preferable that each print job is executed at the print start time as originally designated by the user.

It may be convenient that whether the remaining capacity of the developing area 32B is less than the predetermined amount X is to be considered or not can be selectable by the user. In such a case, the user may operate the operation unit 34 or 45 to select whether the above condition is to be taken into account. According to such a configuration, it is possible to check the above condition during daytime when the number of print requests is relatively large, while the above condition may be ignored during the night when the number of print requests is relatively small and the power consumption mode is preferable.

It should be noted that the invention need not be limited to the configuration described above, and can be modified as follow, for example, without departing the scope of the invention.

In the above-described exemplary embodiment, as identifying information for identifying the print request source, the user information (e.g., the user ID) is utilized. Instead of the user information (user ID), an ID number of the PC 40 or the IP address of the PC 40 may be used.

According to the exemplary embodiment, permission/inhibition of the time change is set through the operation unit 45 of the PC 40. The permission/inhibition of the time change may be set through the operation unit 34 of the printer 1, optionally or alternatively. In such a case, for example, the name of a time-designated print job in the job queue may be displayed on the display unit 35 and the user may operate the operation unit 34 to set permission/inhibition of the time change for the displayed print job.

In the exemplary embodiment, the new print jobs are referred to as the "first reference job." However, this may be modified such that the user may be allowed to determine whether a print job that is generated based on the print request issued by the PC 40 is regarded as the first reference job using the operation unit 45. With such a modification, the user can determine the print start time with respect to which the presence/absence of the close job in accordance with the demand of the user. Alternatively, the printer 1 may be provided with a configuration for designating one of a plurality of print jobs accumulated in the print queue as the first reference job. Specifically, for example, the time-designated print jobs in the print queue are displayed on the display unit 35, and the user may be allowed to select one of the displayed print jobs as the first reference job.

In the above-described embodiment, the process judges, in S8, whether the user of the print job is equal to the user of the first reference job. This configuration may be modified such that a print job of a user who has a predetermined relationship with the user of the first reference job may also be regarded as the close job. Specifically, for example, when groups commonly use the same printer 1, the print jobs of the members of the same group could be the close jobs.

In the extraction process in FIG. 3, if the print start time is set to the first time T1, the time change may be applied to the close jobs before all the close jobs are extracted from the print queue. That is, the time change may be applied to each close job at every extraction of the same.

According to the embodiment, the "print job" is a job created when the print data is received from the PC 40. The invention need not be limited to such a configuration. For example, the printer (or an MFP: Multi-Function Peripheral) has a scanning function and the time-designated printing function can be used for scanned data generated by the scanning function, a job for generating the scanned data by operating the scanning unit may be regarded as a part of the "print job." If an external storage is detachably connectable to the printer, and a so-called direct printing (i.e., retrieving print data stored in the connected external storage and print out the same) can be performed, and if the direct print is also subject to the time-designated print job, the retrieval of the image data from the external storage may be regarded as a part of the "print job."

The printer need not be limited to the laser beam printer, and can be another type of printer such as an inkjet printer, or a device having a printer function such as an MFP (Multi-Function Peripheral) having functions of, for example, the printer and the scanner.

In the above-described embodiment, the first reference job and close jobs are executed continuously at substantially the same term. The invention need not be limited to such a configuration, and the first reference job and the close jobs may be executed intermittently within a predetermined period. In such a case, however, it is preferable that the print start time of a print job other than those of the first reference job and the close jobs does not exist within the predetermined period.

What is claimed is:

1. A printing system including a printing device and an information processing device which is configured to communicate with the printing device, the printing system comprising:
a first storage configured to store a plurality of print jobs corresponding to a plurality of print requests issued by the information processing device, the plurality of print jobs including a first reference job;
a processor configured to execute instructions to perform operations comprising:
identifying a request source of each of the plurality of print jobs stored in the first storage;
judging whether there exists, among the plurality of print jobs, at least one close job which is defined such that a difference between a print start time of the first reference job and a print start time of the at least one close job is within a reference period and a request source of the close job has a predetermined relationship with a request source of the first reference job;
changing the print start time of the first reference job and the print start time of the at least one close job to a time close to a print start time of a second reference job if the at least one close job exists;
maintaining the print start time of the first reference job and the print start time of each of the other of the plurality of print jobs if the first judging unit judges that no close job exists; and
executing a print process regarding the plurality of print jobs when the current time coincides with each of the print start times of the plurality of print jobs.

2. The printing system according to claim 1, wherein when changing the print start time of the first reference job and the print start time of the at least one close job, the processor is further configured to execute instructions to perform operations including setting the print start time of the first reference job and the print start time of the at least one close job such that a print start time of another print job does not exist between the print start time of the first reference job and the print start time of any job of the at least one close job.

3. The printing system according to claim 1, wherein the processor is further configured to execute instructions to perform operations including instructing, when the information processing device issues a print request, whether a print job corresponding to the print request issued by the information processing device is set to be the first reference job.

4. The printing system according to claim 1, wherein the processor is further configured to execute instructions to perform operations including allowing the second reference job to be selected from among the first reference job, the one of the first reference job and the at least one close job having the earliest print start time, and the one of the first reference job and the at least one close job having the latest print start time.

5. The printing system according to claim 1, further comprising a notifying unit,
wherein the processor is further configured to execute instructions to perform operations including providing a notification via the notifying unit that the print start time is changed when the print start time of each of the first reference job and the at least one close job changes.

6. The printing system according to claim 1, wherein the processor is further configured to execute instructions to perform operations including determining whether the print start time of each of the first reference job and the at least one close job are prevented from being changed.

7. The printing system according to claim 1, further comprising:
a second storage configured to store print jobs to be executed,
wherein the processor is further configured to execute instructions to perform operations including judging whether a remaining capacity of the second storage is less than a predetermined capacity,
wherein the print start time of the first reference job and the print start time of the at least one close job are allowed to be changed in a case that the remaining capacity of the second storage is less than the predetermined capacity.

8. A printing device configured to receive print requests from an information processing device configured to communicate with the printing device, comprising:
- a first storage configured to store a plurality of print jobs corresponding to a plurality of print requests issued by the information processing device, the plurality of print jobs including a first reference job;
- a processor configured to execute instructions to perform operations comprising:
  - identifying a request source of each of the plurality of print jobs stored in the first storage;
  - judging whether there exists, among the plurality of print jobs at least one close job which is defined such that a difference between a print start time of the first reference job and a print start time of the at least one close job is within a reference period and a request source of the close job has a predetermined relationship with a request source of the first reference job;
  - changing the print start time of the first reference job and the print start time of each of the at least one close job to a time close to a print start time of a second reference job if the at least one close job exists;
  - maintaining the print start time of the first reference job and the print start time of the other of the plurality of print jobs if no close job exists; and
  - executing a print process regarding the plurality of print jobs when the current time coincides with each of the print start times of the plurality of print jobs.

9. The printing device according to claim 8, wherein when changing the print start time of the first reference job and the print start time of the at least one close job, the processor is further configured to execute instructions to perform operations including setting the print start time of the first reference job and the print start time of the at least one close job such that a print start time of another print job does not exist between the print start time of the first reference job and the print start time of any job of the at least one close job.

10. The printing device according to claim 8, wherein the processor is further configured to execute instructions to perform operations including allowing the second reference job to be selected from among the first reference job, the one of the first reference job and the at least one close job having the earliest print start time, and the one of the first reference job and the at least one close job having the latest print start time.

11. The printing device according to claim 8, further comprising a notifying unit,
- wherein the processor is further configured to execute instructions to perform operations including providing a notification via the notifying unit that the print start time is changed when the print start time of each of the first reference job and the at least one close job changes.

12. The printing device according to claim 8, wherein the processor is further configured to execute instructions to perform operations including determining whether the print start time of each of the first reference job and the at least one close job are prevented from being changed.

13. The printing device according to claim 8, further comprising:
- a second storage configured to be executed; and
- wherein the processor is further configured to execute instructions to perform operations including judging whether a remaining capacity of the second storage is less than a predetermined capacity,
- wherein the print start time of the first reference job and the print start time of the at least one close job are allowed to be changed in a case that the remaining capacity of the second storage is less than the predetermined capacity.

14. The printing device according to claim 8, wherein the predetermined relationship includes a relationship of having the same request source.

15. A non-transitory computer-accessible recording medium containing a program to be executed by a controller of a printing device, the program, when executed, controlling the printing device to execute time-designated print jobs, the program controlling the printing device to execute the steps of:
- storing a plurality of time-designated print jobs, the plurality of time-designated print jobs including a first reference job;
- identifying a request source of each of the plurality of time-designated print jobs stored in the first storage;
- first judging whether there exists, among the plurality of print jobs, at least one close job which is defined such that a difference between a designated execution time of the first reference job and a designated execution time of the at least one close job is within a reference period and a request source of the close job has a predetermined relationship with a request source of the first reference job;
- changing the designated execution time of the first reference job and the designated execution time of the at least one close job to a changed execution time close to a designated execution time of a second reference job if the first judging step judges that the at least one close job exists, the changing step maintaining the designated execution time of the first reference job and the print start time of the other of the plurality of print jobs if the first judging step judges that no close job exists; and
- executing a print process regarding the plurality of time-designated print jobs when the current time coincides with each of the changed designated execution times of the plurality of time-designated print jobs.

16. The non-transitory computer-accessible recording medium according to claim 15, wherein the changed execution time of the first reference job and the changed execution time of the at least one close job are set such that an execution time of another print job does not exist between the designated execution time of the first reference job and the designated execution time of any job of the at least one close job.

17. The non-transitory computer-accessible recording medium according to claim 15, wherein the program further controls the printing device to execute the step of allowing the second reference job to be selected from among the first reference job, the one of the first reference job and the at least one close job having the earliest print start time, and the one of the first reference job and the at least one close job having the latest print start time.

18. The non-transitory computer-accessible recording medium according to claim 15, wherein the program further controls the printing device to execute the step of providing a notification that the designated execution time is changed when the step of changing changes the designated execution time of each of the first reference job and the at least one close job.

19. The non-transitory computer-accessible recording medium according to claim 15, wherein the program further controls the printing device to execute the step of determining whether the designated execution time of each of the first reference job and the at least one close job are prevented from being changed.

20. The non-transitory computer-accessible recording medium according to claim 15,
- wherein the program further controls the printing device to execute the step of second judging whether a remaining capacity of a second storage configured to store print jobs to be executed is less than a predetermined capacity, wherein the step of changing print execution time is allowed to change the designated execution time of the first reference job and execution time of the at least one close job in a case that the remaining capacity of the second storage is less than the predetermined capacity.

* * * * *

UNITED STATES PATENT AND TRADEMARK OFFICE
CERTIFICATE OF CORRECTION

| | | |
|---|---|---|
| PATENT NO. | : 8,289,544 B2 | Page 1 of 1 |
| APPLICATION NO. | : 12/043516 | |
| DATED | : October 16, 2012 | |
| INVENTOR(S) | : Akihiro Yamada | |

It is certified that error appears in the above-identified patent and that said Letters Patent is hereby corrected as shown below:

In the Claims

In Column 11, Claim 13, Line 59:
   Delete "configured to be" and insert -- configured to store print jobs to be --.

Signed and Sealed this
Third Day of September, 2013

Teresa Stanek Rea
*Acting Director of the United States Patent and Trademark Office*